(12) United States Patent
Kasuga et al.

(10) Patent No.: US 6,657,685 B2
(45) Date of Patent: Dec. 2, 2003

(54) LCD DEVICE HAVING AN IMPROVED BACKLIGHT UNIT

(75) Inventors: Koji Kasuga, Tokyo (JP); Yoshinobu Sakaki, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 27 days.

(21) Appl. No.: 09/987,924

(22) Filed: Nov. 16, 2001

(65) Prior Publication Data
US 2002/0063814 A1 May 30, 2002

(30) Foreign Application Priority Data
Nov. 29, 2000 (JP) ........................................ 2000-363096

(51) Int. Cl.[7] ............................................. G02F 1/1335
(52) U.S. Cl. ....................................................... 349/65
(58) Field of Search ................................. 349/65; 362/26

(56) References Cited

U.S. PATENT DOCUMENTS 5,914,760 A * 6/1999 Daiku ......................... 349/65
6,181,391 B1 * 1/2001 Okita et al. ................. 349/65
2001/0002145 A1 5/2001 Lee et al.

FOREIGN PATENT DOCUMENTS

| JP | 5-50432 | 7/1993 |
| JP | 6-347787 | 12/1994 |
| JP | 10-97806 | 4/1998 |
| JP | 10-319215 | 12/1998 |
| JP | 2000-19516 | 1/2000 |
| JP | 2001-201733 | 7/2001 |

* cited by examiner

Primary Examiner—John F. Niebling
Assistant Examiner—Andre C Stevenson
(74) Attorney, Agent, or Firm—Foley & Lardner

(57) ABSTRACT

An LCD device has an LCD panel, a backlight unit for irradiating the rear surface of the LCD panel, and a backlight chassis for positioning the backlight unit with respect to the LCD panel. The backlight unit has a lamp, an optical conductive plate and an optical sheet assembly formed on the optical conductive plate. The optical sheet assembly includes a pair of light scattering sheets and a pair of lens sheets sandwiched between the pair of light scattering sheets. The edges of the lens sheets protrude from the edge of one of the light scattering sheet, which is flush with the edge of the optical conductive plate. A bright line degrading the image quality of the LCD device can be suppressed.

11 Claims, 8 Drawing Sheets

LCD DEVICE HAVING AN IMPROVED BACKLIGHT UNIT

BACKGROUND OF THE INVENTION (a) Field of the Invention

The present invention relates to a liquid crystal display (LCD) device having an improved backlight unit and, more particularly, to the improvement of the structure of the optical sheet assembly in the backlight unit of the LCD device.

(b) Description of the Related Art

An LCD device has the advantages of smaller thickness and lightweight, and thus is used as a flat display panel in a variety of applications. The LCD device generally includes a display panel, a backlight unit for irradiating the display panel from the rear surface thereof, a housing for receiving therein the display panel and the backlight unit in one body so that the front screen of the display panel is exposed from a front opening of the housing, and a backlight chassis for positioning the backlight unit with respect to the LCD panel within the housing.

FIG. 1 shows a typical LCD device 10 in an exploded view thereof. The LCD device 10 includes an LCD panel 12 having a front screen, a backlight unit 14 disposed at the rear side of the LCD panel 12 for irradiating the LCD panel at the rear side, and a housing including a frame member 16 and a pair of holders 18 which support the LCD panel 12 and the backlight unit 14 at the top and bottom sides of the LCD panel in association with the frame member 16, and a backlight chassis (not shown) for positioning the backlight unit 14 with respect to the LCD panel 12 within the housing. The LCD panel 12 mounts thereon drive circuits 32 and 34 at the edge of the LCD panel 12.

The frame member 16 is made of a metallic body 16 which defines a window 20 for exposing therethrough the front screen of the LCD panel 12. The frame member 16 acts as an electrostatic shield for the LCD device. The frame member 16 is engaged with the holders 18 to thrust the LCD panel 12 toward the backlight unit 14.

FIG. 2 shows the top corner of the typical LCD device 10, in a sectional view taken along line II—II in FIG. 1.

In FIG. 2, the LCD panel 12 includes a color filter 26 and a TFT substrate 28, which are sandwiched between a first (front) polarizing plate 22 and a second (rear) polarizing plate 24. A black matrix 30 is disposed between the color filter 26 and the TFT substrate 28 to cover the periphery of the TFT substrate 28 for preventing the backlight from passing the LCD panel 12.

The backlight unit 14 includes a light source 36 for emitting light, an optical guide plate 38 made of acrylic resin for passing therethrough the light emitted by the light source 36, and a laminated, optical sheet assembly 48 including a first light scattering sheet 40, a first lens sheet 42, a second lens sheet 44 and a second light scattering sheet 46, which are consecutively formed on the front surface of the optical guide plate 38. A reflective sheet 50 is formed on the rear surface of the optical guide plate 38 for reflecting the light passing the rear surface of the optical guide plate 38 toward the internal thereof.

The optical guide plate 38 receives light from the light source 36 at the light receiving edge 38b thereof and passes the received light through the front surface 38a thereof. The first and second light scattering sheets 40 and 46 have a function for scattering the light passing therethrough to obtain a uniform brightness of the front screen. The first and second lens sheets 42 and 44 are made of a plastic material having a thickness of about 0.2 mm. Each of the first and second lens sheet 42 and 44 has a plurality of triangle prisms extending horizontally or vertically and arranged on the rear surface thereof. The first and second lens sheets 42 and 44 have a function for correcting the direction of the light passed from the optical guide plate 38 to form a substantially parallel ray on the front screen of the LCD panel 12.

The light source 36 of the backlight unit 14 is implemented by a cylindrical elongate lamp extending along the light receiving edge 38b of the optical conductive plate 38. A metallic reflecting member 54 having a "]" shape in cross section is disposed for encircling the lamp 36. The metallic reflecting member 54 has a first edge abutted with the light receiving edge 38b near the front side thereof, and a second edge sandwiched between the holder 18 and the reflective sheet 50 disposed at the rear surface of the optical conductive plate 38.

The backlight chassis 56, as mentioned before, is made of an opaque plastic material and is disposed for positioning and supporting the optical conductive plate 38, the optical sheet assembly 48, the lamp 36 and the metallic reflecting member 54 with respect to the LCD panel 12 while encircling these members. A spacer 58 made of a plastic material is disposed between the backlight chassis 56 and the metallic reflecting member 54.

FIG. 3 shows, in a sectional view, a side edge portion 60 of a conventional LCD device 10A having configurations such as shown in FIGS. 1 and 2, wherein FIG. 3 is taken along a line corresponding to line III—III in FIG. 1. In FIG. 3, the optical conductive plate 38 has an edge 38c, other than the light receiving edge 38b, the edge 38c being flush with the edges of the first scattering sheet 40, the first lens sheet 42 and the second lens sheet 44 of the optical sheet assembly 48. The edge 38c opposes the inner surface 56a of the backlight chassis 56. The second scattering sheet 46 of the optical sheet assembly 48 has an extended edge 46a protruding from the edges of the first scattering sheet 40 etc. of the optical sheet assembly 48, and mounted on a step 56b of the backlight chassis 56, with an intervention of a cushion member 57 disposed therebetween.

The LC drivers 32 and 34 are mounted on a support member 62 disposed at the rear side of the reflective sheet 50. TCPs (tape carrier packages) 66 extend from the LC drivers 32 and 34 toward the front side of the LCD panel 12 for transferring driving signals for the LCD panel 12.

FIG. 4 is a schematic view showing the situation wherein the screen of the conventional LCD device 10A is observed by a human eye with an angle "a" which is the supplementary angle of the viewing angle of the LCD panel. In the vicinity of the black matrix 30, the human eye observes a bright line, which passes the space between the edge 38c of the optical conductive plate 38 and the inner surface 56a of the backlight chassis 56 while being repetitively reflected by the edge 38c of the optical conductive plate 38 and the inner surface 56a of the backlight chassis 56.

The bright line appearing in the vicinity of the image of the black matrix 30 of the LCD device significantly degrades the image quality of the LCD device, and is thus undesirable.

SUMMARY OF THE INVENTION

In view of the above, it is an object of the present invention to provide an LCD device having an excellent image quality by suppressing the bright line as encountered in the conventional LCD device.

The present invention provides, in a preferred embodiment thereof, a liquid crystal display (LCD) device including: an LCD panel; a backlight unit including a light source, an optical conductive plate including a light receiving edge for receiving therein light from the light source, three remaining edges, and a light emitting surface for irradiating therethrough the light received through the light receiving edge toward the LCD panel, and an optical sheet assembly including a first light scattering sheet, a first lens sheet, a second lens sheet and a second light scattering sheet consecutively formed on the light emitting surface; and a backlight chassis for positioning the light source, the optical conductive plate and the optical sheet assembly with respect to the LCD panel, wherein at least the first and second lens sheets among the optical sheet assembly have extended edges adjacent to one of the three remaining edges, the extended edges protruding from the one of the three remaining edges toward the backlight chassis.

In accordance with the LCD device of the present invention, the bright line which degraded the image quality of the conventional LCD device is suppressed by the extended edge of the lens sheet.

PREFERRED EMBODIMENTS OF THE INVENTION

Before describing preferred embodiments of the present invention, the principle of the present invention is described for a better understanding of the present invention.

Figure 4:
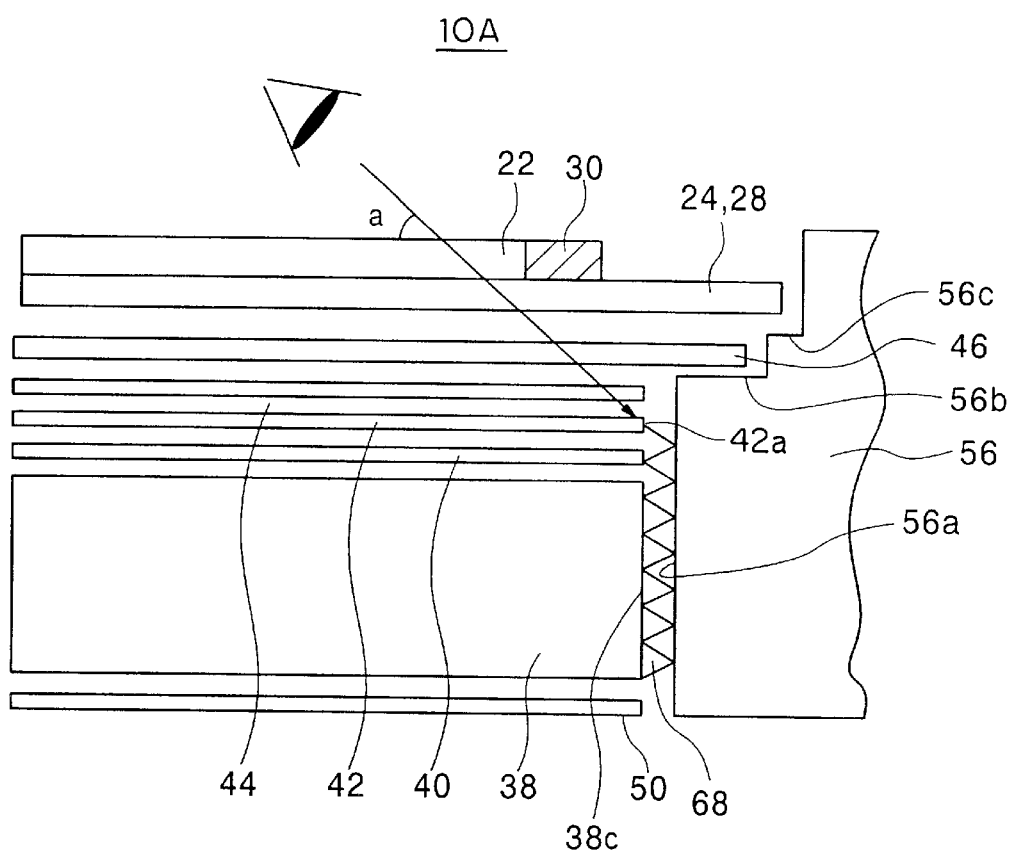
FIG. 4 is a schematic sectional view of the conventional LCD device for showing the bright line problem therein.

In the conventional LCD device shown in FIG. 4, the edges of the reflective sheet 50, the optical conductive plate 38, the first light scattering sheet 40, the first lens sheet 42, and the second lens sheet 44 are aligned with each other, with a space 68 of 0.5 to 1.0 mm being disposed between the edges and the inner surface 56a of the backlight chassis 56. In addition, the edge of the second light scattering sheet 46 protrudes from the edge 38c of the optical conductive plate 38 and the edges of the other sheets in the optical sheet assembly 48, and is mounted on a first step 56b of the backlight chassis 56. The edges of the second polarizing plate 24 and the TFT substrate 28 are mounted on a second step 56c of the backlight chassis 56.

The light emitted by the lamp 36 and then received and guided by the optical conductive plate 38 leaks from the edges (or side surfaces) of the optical conductive plate 38, such as the edge 38c, other than the light receiving edge 38b near the lamp 36. The leakage light is repetitively reflected by the surface 56a of the backlight chassis 56 and by the edges, such as the edge 38c, of the optical conductive plate 38 to advance toward the front screen of the LCD panel 12.

When the reflected light is incident onto the edge surface 42a of the first lens sheet 42, the incident light is reflected by the edge surface 42a, thereby brightening the edge surface 42a. The brightened edge surface 42a is observed in the vicinity of the image of the black matrix 30 on the screen as a bright line by the human eye. This bright line especially occurs when the human eye observes the screen with a larger viewing angle or smaller angle "a".

For solving the above problem, the conventional LCD device generally uses a first lens sheet 42 having an edge printed by black or covered by a shield tape or film. However, this solution raises the cost, and in addition, is difficult to achieve due to the poor accuracy in the positioning of the printing or covering. The poor accuracy causes that the printed black or shield film is observed as a dark line instead of the bright line, which is also undesirable.

Figure 5:
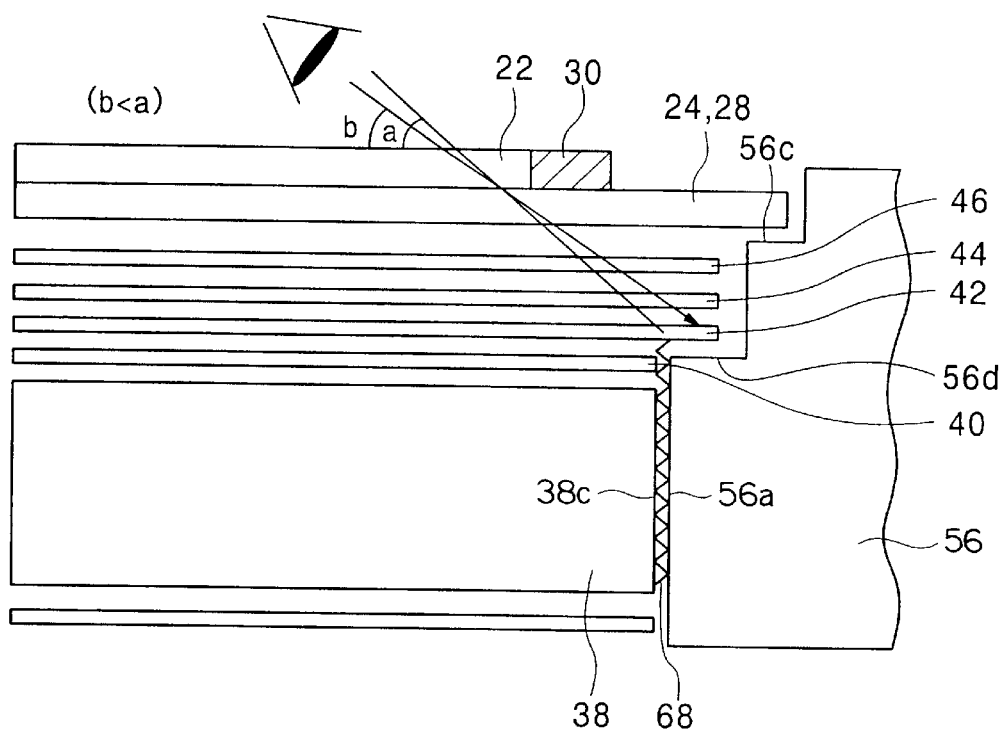
FIG. 5 is a schematic sectional view of an LCD device for showing the principle of solving the problem by the present invention.

The present invention solves the above problem by using a configuration such as shown in FIG. 5, wherein the light which advances toward the front screen of the LCD panel while being repetitively reflected by the edge 38c of the optical conductive plate 38 and the inner surface 56a of the backlight chassis 56 is not incident onto the edges of the lens sheets 42 and 44. The light is passed by the first lens sheet 42 similarly to other portion of the normal light passed by the light emitting surface of the optical conductive plate 38. This is achieved by extended edges of the lens sheets 42 and 44. The extended edges are received in the depression formed at the inner surface 56a of the backlight chassis 56 and mounted on a step 56d formed adjacent to the inner surface 56a of the backlight chassis 56.

Now, the present invention is more specifically described with reference to preferred embodiments thereof shown in the accompanying drawings, wherein similar constituent elements are designated by similar reference numerals throughout the drawings.

Figure 1:
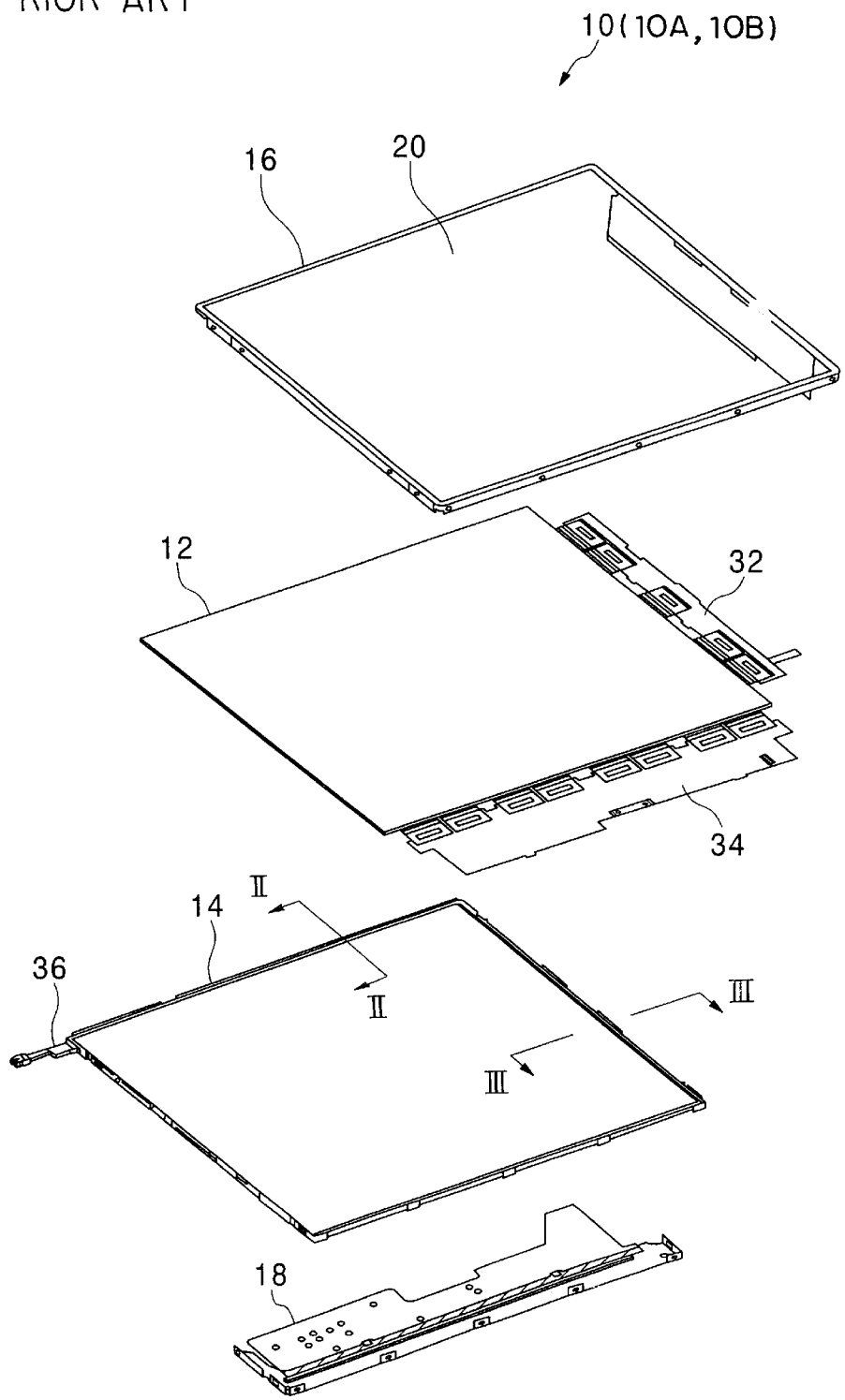
FIG. 1 is an exploded view of a typical LCD device.
Figure 2:
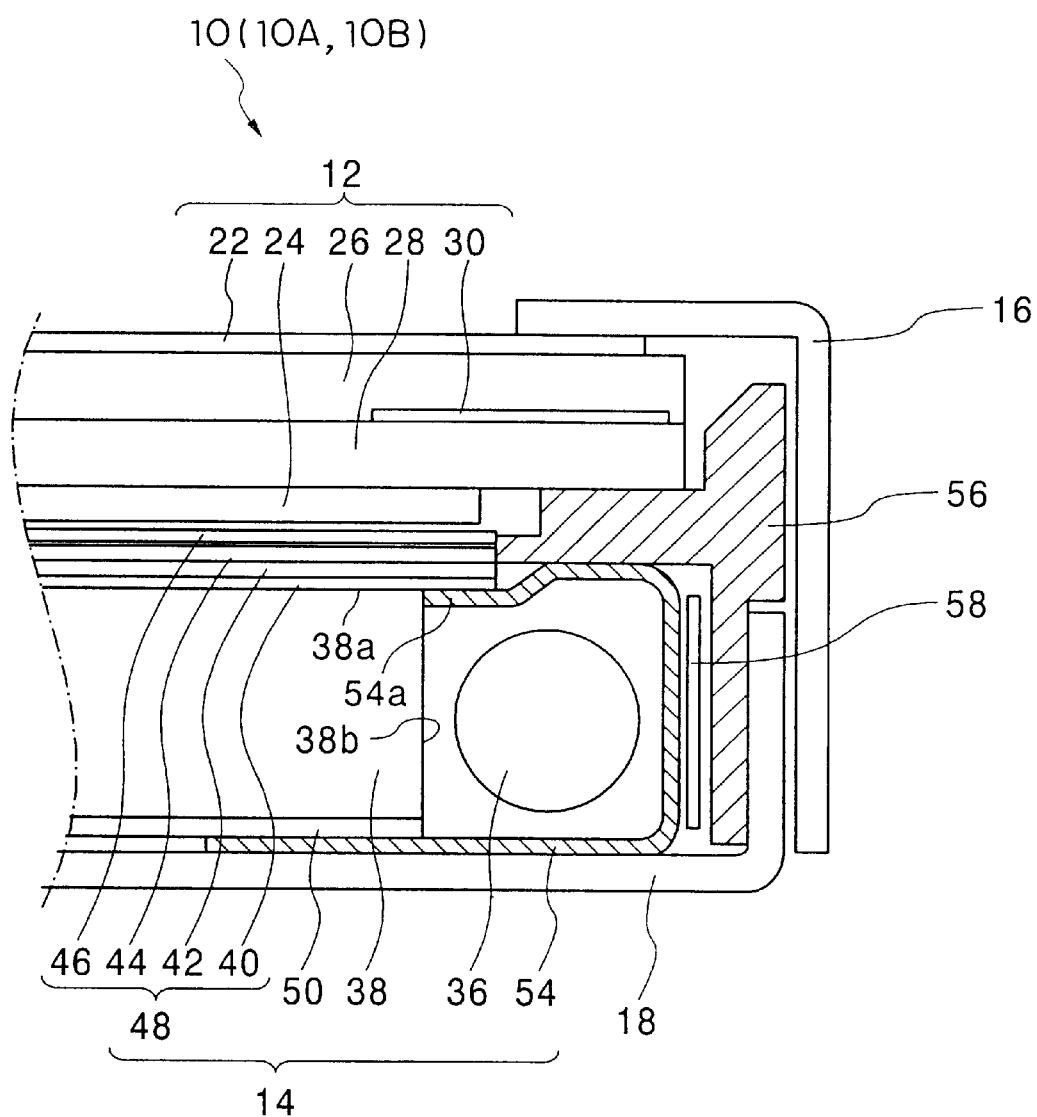
FIG. 2 is a partial sectional view of the typical LCD device taken along line II—II in FIG. 1.
Figure 6:
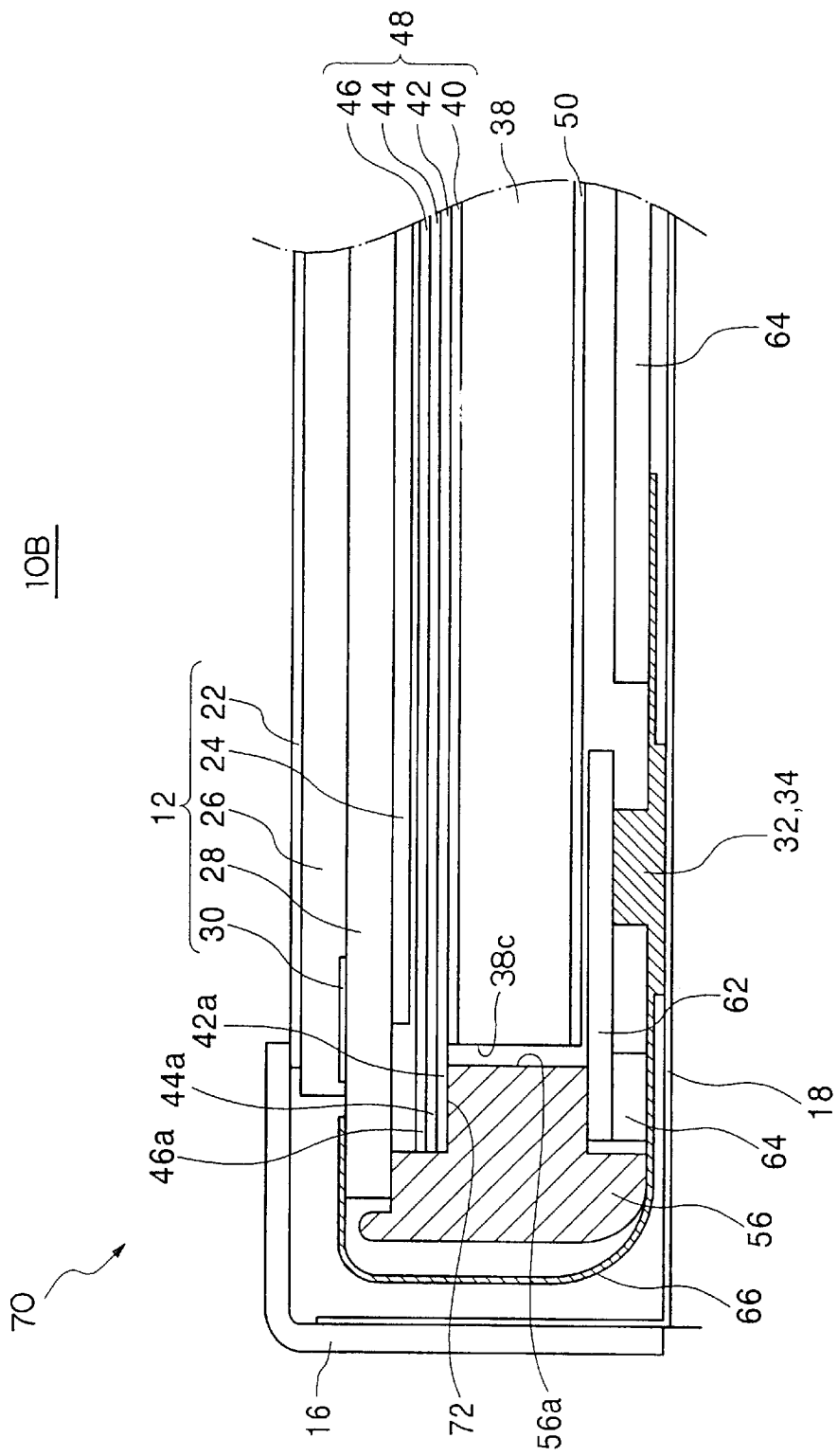
FIG. 6 is a partial sectional view of an LCD device according to a first embodiment of the present invention.

Referring to FIG. 6, an LCD device 10B according to a first embodiment of the present invention has configurations similar to those of the typical LCD device 10 shown in FIGS. 1 and 2.

More specifically, as shown in FIG. 1, the LCD device 10B of the present embodiment includes an LCD panel 12 having a front screen, a backlight unit 14 disposed at the rear side of the LCD panel 12 for irradiating the LCD panel 12 at the rear side, a housing including a frame member 16 and a pair of holders 18 which support the LCD panel 12 and the backlight unit 14 at the top and bottom sides of the LCD panel in association with the frame member 16, and a backlight chassis not shown therein. The LCD panel 12 mounts thereon drive circuits 32 and 34 at the edge of the LCD panel 12.

The frame member 16 is made of a metallic body 16 which defines a window 20 for exposing therethrough the front screen of the LCD panel 12. The frame member 16 acts as an electrostatic shield for the LCD device. The frame member 16 is engaged with the holders 18 to thrust the LCD panel 12 toward the backlight unit 14.

In FIG. 2, the LCD device 10B includes a color filter 26 and a TFT substrate 28, which are sandwiched between a first (front) polarizing plate 22 and a second (rear) polarizing plate 24. A black matrix 30 is disposed between the color filter 26 and the TFT substrate 28 to cover the periphery of the TFT substrate 28.

The backlight unit 14 includes a light source 36 for emitting light, an optical guide plate 38 made of acrylic resin for passing therethrough the light emitted by the light source 36, and a laminated, optical sheet assembly 48 including a first light scattering sheet 40, a first lens sheet 42, a second lens sheet 44 and a second light scattering sheet 46, which are consecutively formed on the front surface of the optical guide plate 38. A reflective sheet 60 is formed on the rear surface of the optical guide plate 38 for reflecting the light passing the rear surface of the optical guide plate 38 toward the internal thereof.

Figure 3:
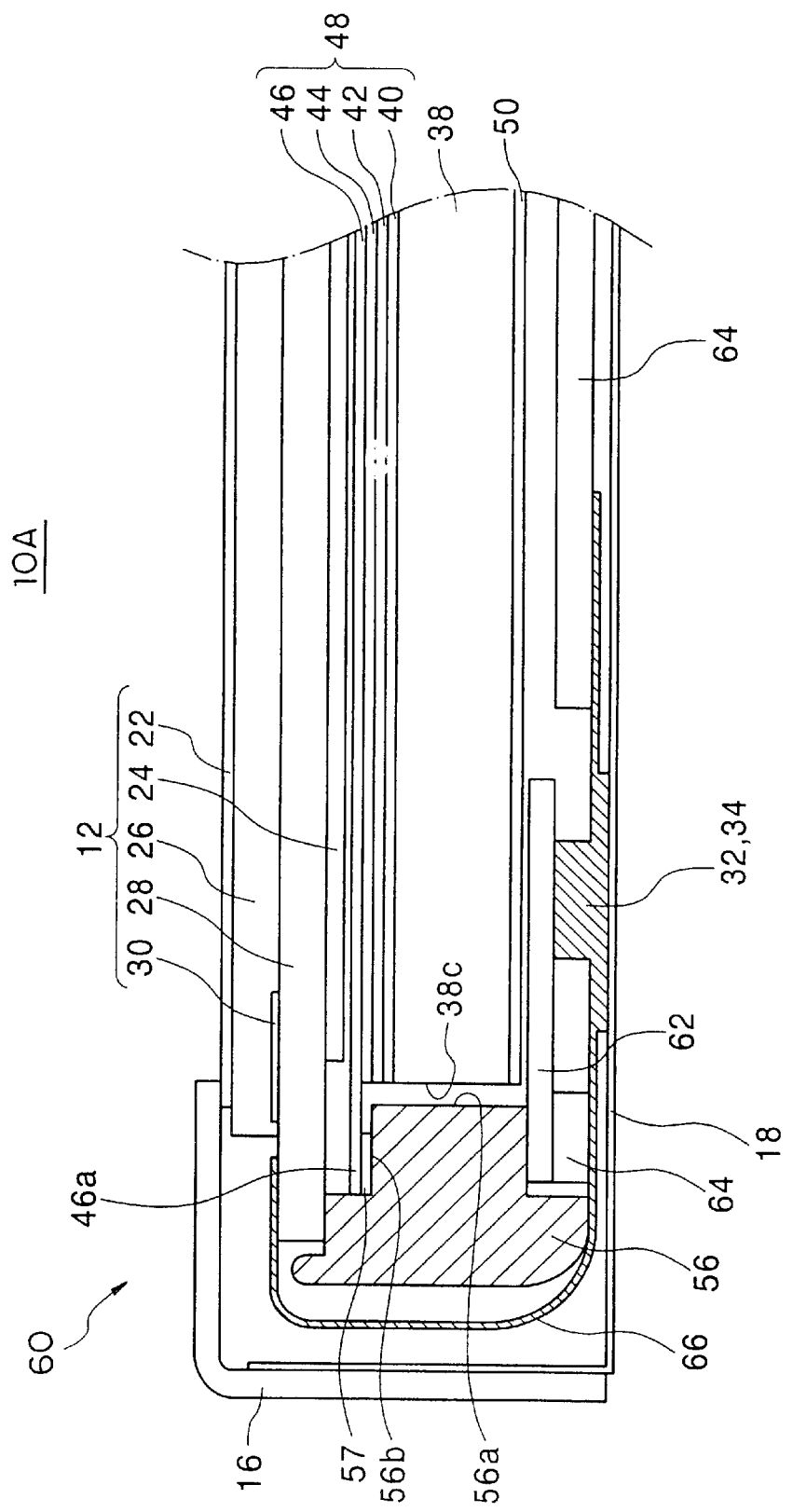
FIG. 3 is a partial sectional view of a conventional LCD device taken along line corresponding to line III—III in FIG. 1.

Back to FIG. 6, the LCD device 10B of the present embodiment is different from the conventional LCD device 10A of FIG. 3 in the configuration of the edge portion 70. More specifically, the first light scattering sheet 40 has an edge flush with the edge of the optical conductive sheet 38, and opposes the surface 56a of the backlight chassis 56. On the other hand, the edges of the first lens sheet 42, the second lens sheet 44 and the second light scattering sheet 46 protrude from the edge of the first light scattering sheet 40. These extended edges 42a, 44a, and 46a are received in the depression formed in the inner surface 56a of the backlight chassis 56, and mounted on a step 72 of the backlight chassis 56.

In the configuration of the LCD device 10B of the present embodiment, the light which advances toward the LCD panel 12 while being repetitively reflected by the edge 38c of the optical conductive sheet 38 and the inner surface 56a of the backlight chassis 56 is incident onto the rear surface of the first lens sheet 42. This incident light is passed to the LCD panel 12 similarly to the other portion of the light passed by the light emitting surface of the optical conductive plate 38. Thus, a bright line as encountered in the conventional LCD device is not observed on the front screen of the LCD panel 12 even at a larger viewing angle.

The configuration of the edge portion 70 of the LCD device 10B of the present embodiment may be replaced by another configuration so long as the leakage light repetitively reflected by the edge 38c of the optical conductive plate 38 is not observed as a bright line by a human eye on the front screen of the LCD device. For example, the second light scattering sheet 46 of the optical sheet assembly 48 may have an edge further protruding from the extended edges of the first lens sheet 42 and the second lens sheet 44. In addition, the first light scattering sheet 40 may have an edge protruding from the edge 38c of the optical conductive plate 38 and may be mounted on another step of the backlight chassis 56.

Figure 7:
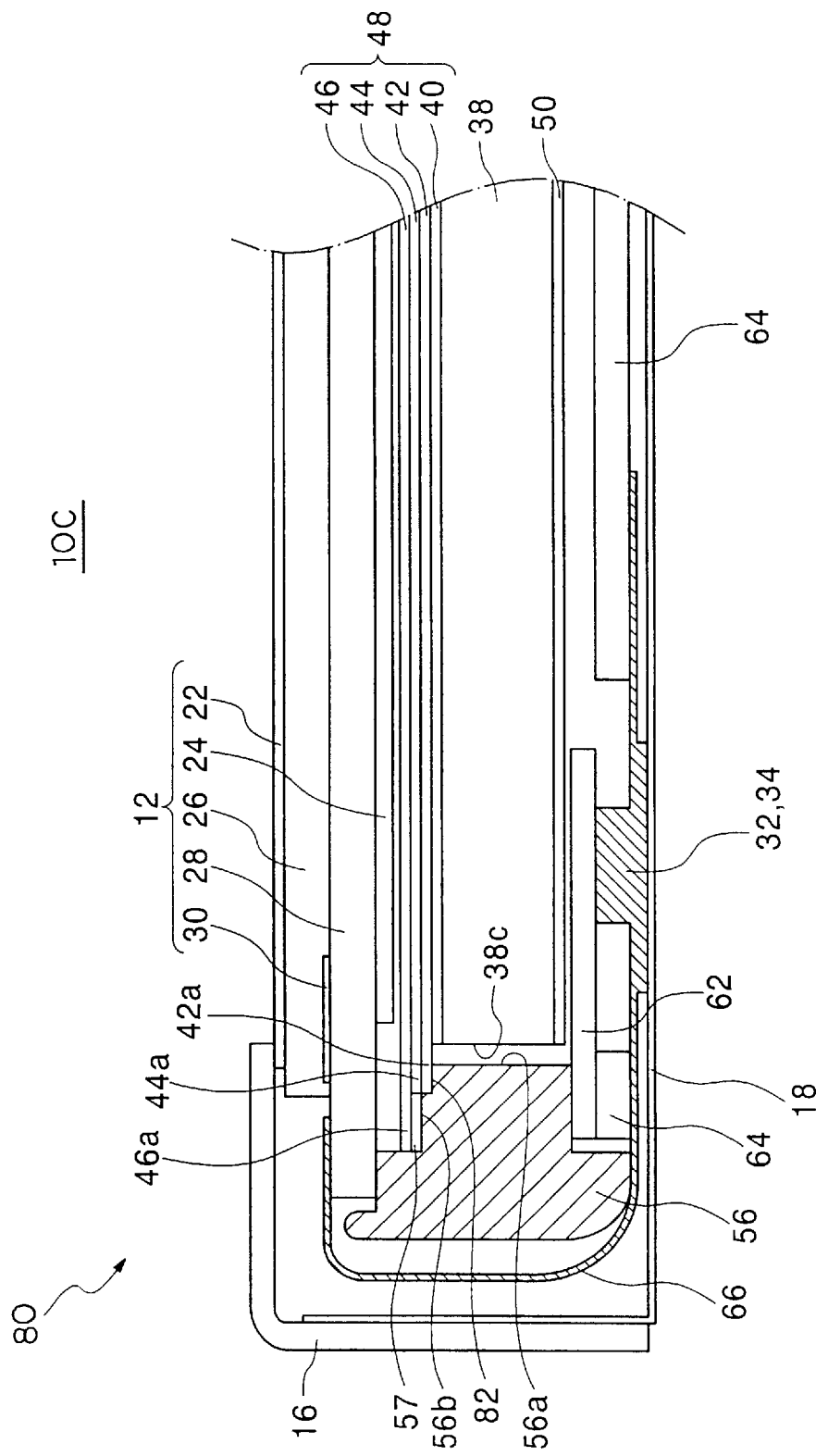
FIG. 7 is a partial sectional view of an LCD device according to a second embodiment of the present invention.

Referring to FIG. 7, an LCD device, generally designated by numeral 10C, according to a second embodiment of the present invention is similar to the first embodiment except for the edge of the optical sheet assembly 48. More specifically, the edge of the first light scattering sheet 40 is flush with the edge 38c of the optical conductive plate 38, and opposes the inner surface 56a of the backlight chassis 56. On the other hand, the edges 42a and 44a of the first and second lens sheets 42 and 44 protrude from the edge of the first light scattering sheet 40, is mounted on a step 82 of the backlight chassis 56, and is flush with each other. In addition, the edge 46a of the second light scattering sheet 46 further protrudes from the edges 42a and 44a of the first and second lens sheets 42 and 44, and is mounted on the step 56b of the backlight chassis 56. The space between the step 82 of the backlight chassis 56 and the outer portion of the edge 46a of the second light scattering sheet 46 is provided with a cushion member 57.

Figure 8:
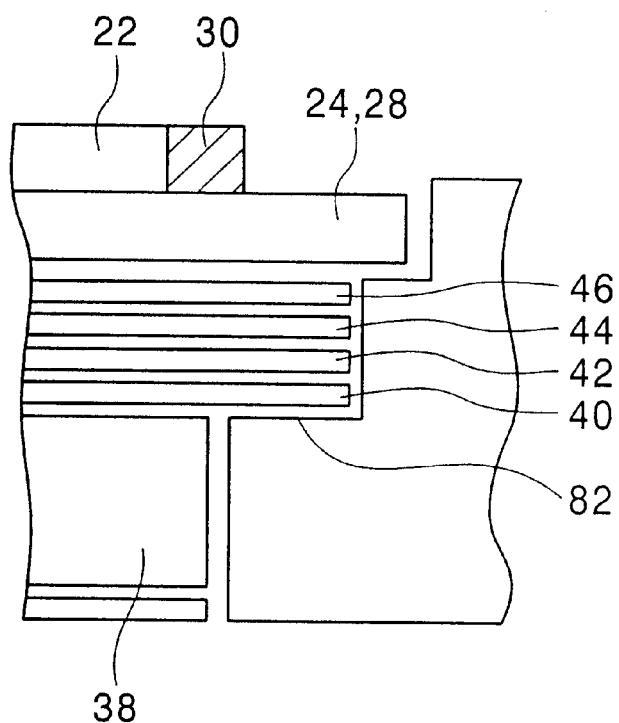
FIG. 8 is a partial sectional view of an LCD device according to modification of the second embodiment.

Referring to FIG. 8, an LCD device 10D according to a modification of the second embodiment of the present invention is such that the optical sheet assembly 48 has edges of the respective sheets 40, 42, 44 and 46 which are flush with each other, protrude from the edge 38c of the optical conductive plate 38, and are mounted on the step 82 of the backlight chassis.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising:
an LCD panel;
a backlight unit including a light source, an optical conductive plate including a light receiving edge for receiving therein light from said light source, three remaining edges, and a light emitting surface for irradiating therethrough the light received through said light receiving edge toward said LCD panel, and an optical sheet assembly including at least one lens sheet and a light scattering sheet consecutively formed on said light emitting surface; and
a backlight chassis for positioning said light source, said optical conductive plate and said optical sheet assembly with respect to said LCD panel, wherein:
said at least one lens sheet has an extended edge adjacent to one of said three remaining edges, said extended edge protruding from said one of said three remaining edges toward said backlight chassis.

2. The LCD device as defined in claim 1, wherein said optical sheet assembly includes another light scattering sheet formed between said light emitting surface and said at least one lens sheet, said another light scattering sheet having an edge flush with said one of said three remaining edges.

3. The LCD device as defined in claim 1, wherein said optical sheet assembly includes another light scattering sheet formed between said light emitting surface and said at least one lens sheet, wherein said another light scattering sheet has an edge flush with said extended edge.

4. The LCD device as defined in claim 3, wherein said light scattering sheet has an edge flush with said extended edge.

5. The LCD device as defined in claim 1, wherein said light scattering sheet has an edge protruding from said extended edge.

6. The LCD device as defined in claim 1, wherein said backlight chassis has a step for mounting thereon said extended edge.

7. The LCD device as defined in claim 6, wherein said light scattering sheet has an edge protruding from said extended edge, said backlight chassis having another step for mounting thereon said edge of said light scattering sheet.

8. The LCD device as defined in claim 1, wherein all light incident on said another light scattering sheet passes through at least a portion of said optical conductive plate.

9. The LCD device according to claim 1, wherein said backlight chassis is made of an opaque plastic material.

10. The LCD device according to claim 1, further comprising:
a metallic reflecting member surrounding said light source,
wherein said backlight chassis also holds a portion of said metallic reflecting member in place with respect to said light source.

11. The LCD device as defined in claim 1, wherein said one of said three remaining edges of said light conductive plate is orthogonal to said light receiving edge of said light conductive plate.

* * * * *